United States Patent [19]

Morinaga

[11] 4,228,970
[45] Oct. 21, 1980

[54] SAFETY BELT RETRACTOR WITH EMERGENCY LOCKING MECHANISM

[75] Inventor: Masaru Morinaga, Yamato, Japan

[73] Assignee: NSK-Warner K.K., Tokyo, Japan

[21] Appl. No.: 972,508

[22] Filed: Dec. 22, 1978

[30] Foreign Application Priority Data

Jan. 6, 1978 [JP] Japan .................................. 53/408
May 29, 1978 [JP] Japan .............................. 53/63375

[51] Int. Cl.³ ....................... A62B 35/02; B65H 75/48
[52] U.S. Cl. ....................... 242/107.4 A; 242/107.4 B
[58] Field of Search ................ 242/107.4 R, 107.4 E; 280/802–808; 297/475–480

[56] References Cited

U.S. PATENT DOCUMENTS

| | | | |
|---|---|---|---|
| 2,953,315 | 9/1960 | Lautier et al. ................ | 242/107.4 B |
| 3,430,891 | 3/1969 | Burleigh .................... | 242/107.4 B X |
| 3,929,300 | 12/1975 | Lindqvist ....................... | 242/107.4 B |
| 3,955,774 | 5/1976 | Weman ...................... | 242/107.4 B X |
| 3,991,953 | 11/1976 | Takada ........................ | 242/107.4 B X |
| 4,044,969 | 8/1977 | Wallin ......................... | 242/107.4 B X |
| 4,065,071 | 12/1977 | Holmberg ................... | 242/107.4 B X |
| 4,083,512 | 4/1978 | Rumpf ........................ | 242/107.4 B X |

*Primary Examiner*—John M. Jillions
*Attorney, Agent, or Firm*—Shapiro and Shapiro

[57] ABSTRACT

A safety belt retractor for a motor vehicle has an emergency locking mechanism which is of dual sensitive type and senses an emergency of the vehicle by sensing webbing extraction acceleration or speed and by sensing direct speed change or acceleration of the vehicle. When the sensing means senses the emergency of the vehicle the mechanism locks the extraction of the webbing to fasten the vehicle occupant.

8 Claims, 13 Drawing Figures

SAFETY BELT RETRACTOR WITH EMERGENCY LOCKING MECHANISM

BACKGROUND OF THE INVENTION

1. Field of the Invention

The present invention relates to a safety belt retractor adapted for use in a motor vehicle, and more particularly to a safety belt retractor provided with an emergency locking mechanism for fastening the driver or passenger when the vehicle moves with a speed change exceeding a predetermined value.

2. Description of the Prior Art

There are already proposed various safety belt retractors provided with such emergency locking mechanisms, but such retractors inevitably require complicated and expensive parts with an elevated number of component parts in order to achieve precise and secure emergency locking function.

In the prior art of the emergency locking mechanism there are proposed and already in actual use a locking mechanism functionable by sensing the acceleration or deceleration of the vehicle through the extracting acceleration of a webbing as disclosed for example in the U.S. Pat. No. 3,489,799 and a locking mechanism functionable by sensing the acceleration or deceleration of the vehicle directly for example by a pendulum as disclosed for example in the U.S. Pat. No. 3,758,044. Also for a securer locking of the safety belt retractor there is already employed a retractor provided with the above-mentioned two mechanisms as disclosed in the U.S. Pat. No. 4,083,511, but the presence of two complicated mechanisms renders the entire retractor larger and also expensive due to the elevated number of component parts required.

SUMMARY OF THE INVENTION

The object of the present invention, therefore, is to provide a safety belt retractor of a simplified structure and still allow secure functioning.

Another object of the present invention is to provide a safety belt retractor wherein a so-called dual-sensing type emergency locking mechanism comprising an emergency locking mechanism functionable by sensing the webbing extracting acceleration and another emergency locking mechanism functionable by sensing the vehicle acceleration can be composed of component parts common to said two mechanisms.

In order to achieve the above-mentioned objects, the safety belt retractor of the present invention is featured by a structure comprising a rotary member which is separate from a take-up shaft of the retractor but is provided coaxially with said take-up shaft and which usually rotates integrally with said take-up shaft but performs a relative movement with respect thereto when the acceleration or deceleration of the vehicle reaches a predetermined value, at least a latch member articulated on said rotary member, an engaging member coming into engagement with said latch member at least when said rotary member performs relative movement with respect to said take-up shaft to displace said latch member in a direction away from the center of shaft, and locking means coming into engagement with said latch member when it is displaced in a direction away from the center of shaft to arrest the rotation of said take-up shaft.

In order to achieve the above-mentioned objects the present invention is further featured, in a safety belt retractor provided with means for sensing a predetermined acceleration of the vehicle and adapted to lock webbing take-up means upon said sensing, by an emergency locking mechanism comprising a rotary member which is separate from said take-up means but is provided coaxially therewith and rotates therewith in the ordinary state, arresting means for arresting the rotation of said rotary member in cooperation with said sensing means at a predetermined acceleration of the vehicle, a support member provided integrally with said take-up means and axially parallel to said rotary member, latch means provided on said support member and comprising at least a latch member which can assume a locking position and an unlocking position and which is normally located in said unlocking position, an engaging member provided on said rotary member and allowing displacement of said latch member to said locking position when said rotary member is arrested to perform a relative movement with respect to said take-up means, and locking means adapted to engage with said latch member guided to said locking position to arrest the rotation of said retracting means.

The present invention will become fully apparent from the following detailed description thereof taken in conjunction with the accompanying drawings.

DESCRIPTION OF THE PREFERRED EMBODIMENT

Figure 1:
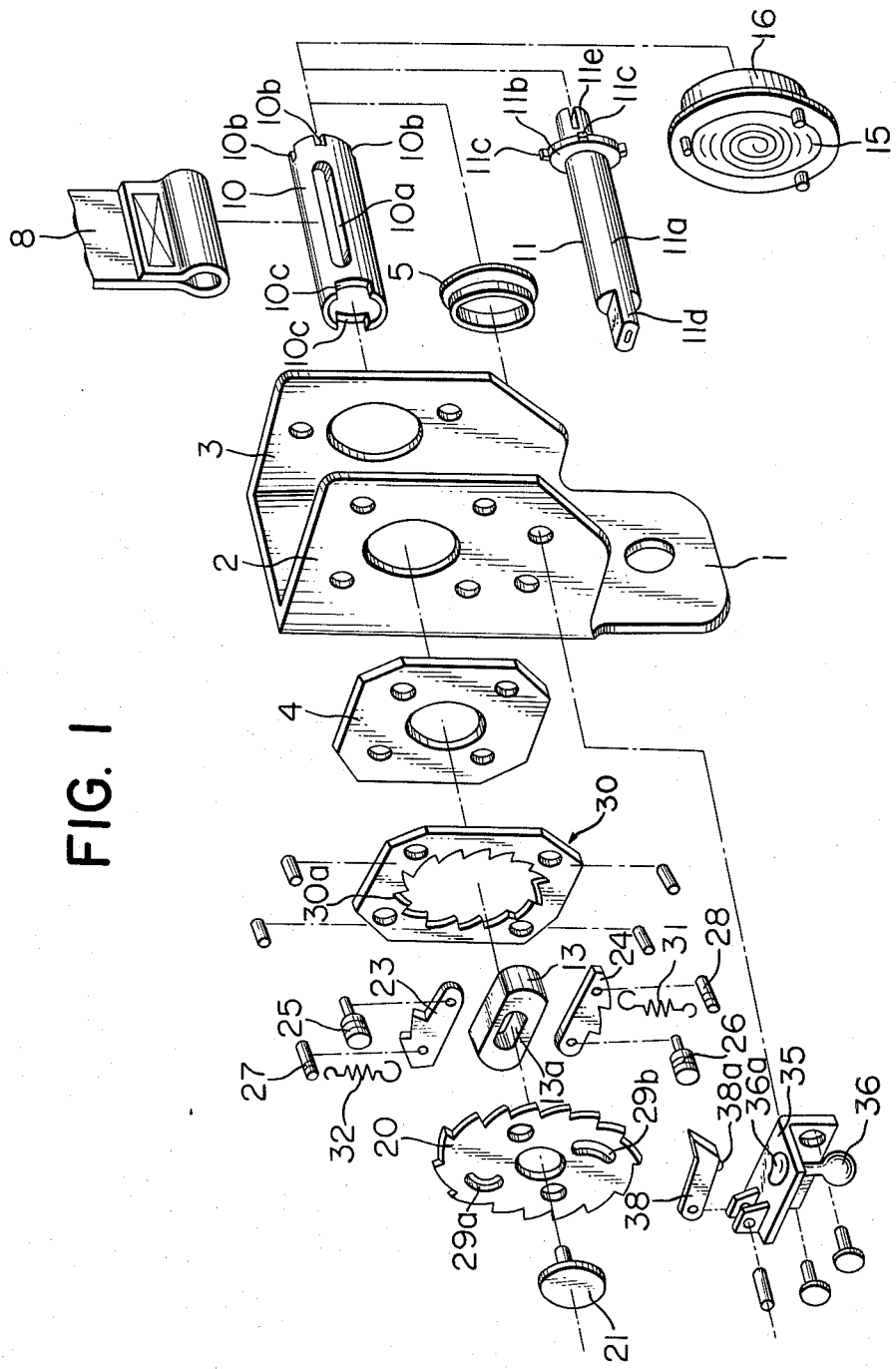
FIG. 1 is an exploded view of an embodiment of the present invention.
Figure 2:
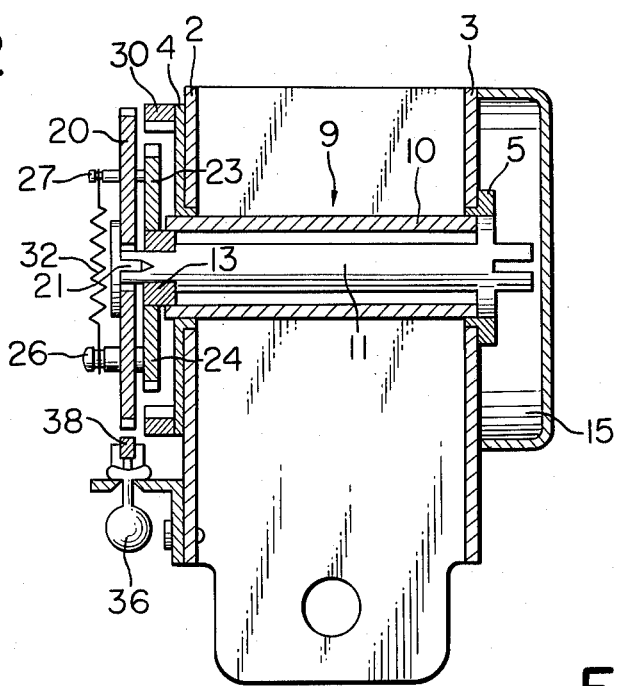
FIG. 2 is a cross-sectional view along the center thereof.
Figure 3:
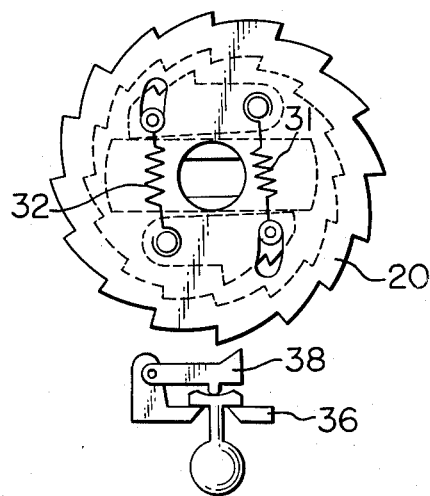
FIGS. 3 to 6 are partial lateral views showing the order of function of said embodiment.
Figure 4:
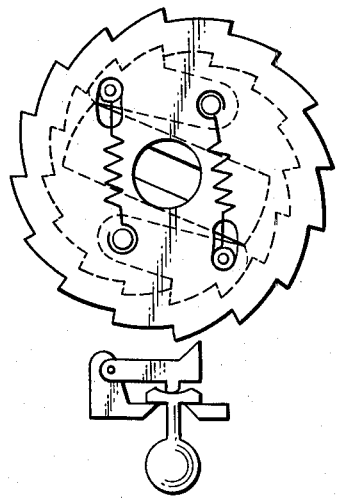
Figure 5:
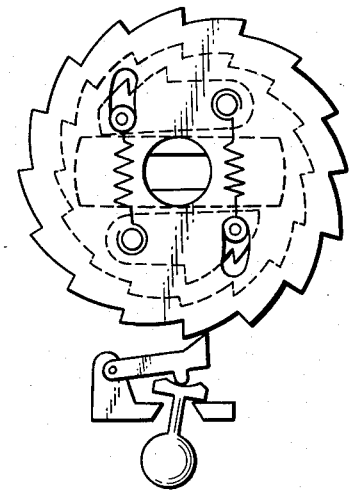
Figure 6:
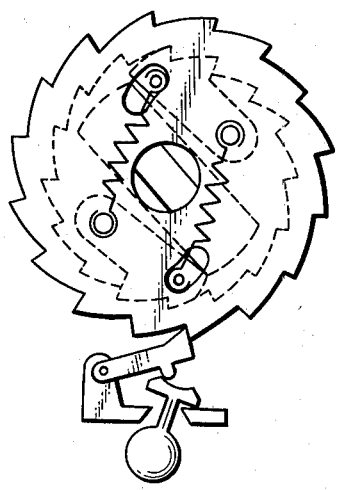

In the following there will be given an explanation on the first embodiment of the present invention, while making reference to FIGS. 1 to 4.

In a main body 1 of the safety belt retractor there are integrally provided mutually parallel lateral plates 2 and 3 which rotatably support, in the openings provided in the approximate center thereof and through a bearing plate 4 and a bushing 5, take-up shaft 9 for a webbing 8. The take-up shaft 9 may be of any conventional structure but is principally composed, in the present embodiment, of a cylindrical member 10 formed as a preferably metallic reinforcing member and a shaft member 11 of a plastic material. The cylindrical member 10 is provided axially with a slot 10a for inserting the webbing and further provided at the right-hand end thereof with four notches 10b mutually separated by 90° and at the left-hand end thereof with mutually facing two larger notches 10c. The shaft member 11 is provided with a rod portion 11a extending through the interior of said cylindrical member, said rod portion being provided in the vicinity of the right-hand end thereof with an enlarged portion 11b of an external diameter meeting the internal diameter of said cylindrical portion 10 and having, on the external periphery of said enlarged portion, four projections 11c to respectively engage with said notches 11b of the cylindrical member. Also said shaft member 11 is provided at the left-hand end thereof with a flat portion 11d on which fixed is a support member 13 having an internal opening of a shape corresponding to the shape of said flat portion. The support member 13 is further fitted into said notches 10c at the left-hand end of the cylindrical member 10, whereby the take-up shaft 9 is composed of the assembled structure of the cylindrical member 10, shaft member 11 and support member 13. The internal end of the webbing 8 is foldedly woven and inserted into the cylindrical member 10 through the axial slot thereof, whereby the shaft member 11 passes through the folded loop to secure the webbing 8 to the take-up shaft 9. In this manner the take-up shaft 9 can be easily manufactured and still can have a satisfactory strength due to the presence of the cylindrical member 10.

The extended portion 11e at the right-hand end of the take-up shaft 9 engages the internal end of a take-up spring 15 the external end of which is mounted on a spring cover 16 affixed on the lateral wall 3, whereby the take-up shaft 9 being biased in a direction to retract the webbing.

Now in the following there will be given an explanation on the emergency locking mechanism constituting the principal part of the present invention.

The shaft member 11 of the take-up shaft 9 extends beyond a bearing plate 4 mounted on the lateral plate 2, where a rotary member 20 is rotatably provided on the shaft member and in the vicinity of the support member, and is maintained in position by means of a support pin 21 inserted into the shaft member 11. On the axially internal face of the rotary member 20 and facing the planar portions of the support member 13 there are provided two latch members 23, 24 symmetrical to the center of the shaft and respectively articulated on pins 25, 26. The latch members 23, 24 are respectively provided, on the other end portions thereof, with spring pins 27, 28 which protrude to the other face of the rotary member 20 through two slots 29a, 29b formed therein and symmetrically to the center of the shaft. Tension springs 31, 32 are mounted respectively between the pin 25 and the spring pin 28 and between the pin 26 and the spring pin 27, thereby biasing the latch members 23, 24 to a radially inward position abutting on the support member 13 of the take-up shaft 9. Due to such mutual positioning of the latch members 23, 24 and the take-up shaft 9 the rotary member 20 is normally rendered rotatable with the take-up shaft 9 in the webbing extracting or retracting direction, but when the rotary member 20 performs a relative rotation with respect to the rotation of the take-up shaft 9 in the webbing extracting direction, namely when the rotation of said rotary member 20 is delayed or arrested in a manner to be explained later, the latch members 23, 24 are pushed by the support member 13 and perform clockwise rotation about the articulating pins thereof within a range limited by the slots 29a, 29b. Though in the present embodiment there are employed two latch members, it is also possible to use one or three or more latch members if desired. Also the springs 31, 32 are not necessarily limited to those explained in the foregoing but may be of any springs capable of biasing the latch members in a radially inward direction.

Radially around the latch members 23, 24 there is provided locking means 30 which is composed in the present embodiment of an inwardly toothed ratchet gear 30a affixed to the side plate 2 of the retractor, the ratchet gear 30a being adapted to engage with the latch members 23, 24 when they are radially outwardly rotated as explained above to lock the rotation of the take-up shaft 9 in the webbing extracting direction while allowing the rotation in the webbing retracting direction which coincides with the escaping direction of the tooth from the ratchet gear 30a.

The locking means 30 is however not limited to the structure shown above. For example it is also possible to render the ratchet gear 30a rotatable within a certain angular range with respect to the side plate 2, whereby the rotation of the ratchet gear displaces a locking member to a position engaging with a ratchet gear affixed on the take-up shaft thereby locking said take-up shaft.

Thus an emergency locking mechanism of so-called webbing acceleration sensing type can be obtained if the rotary member 20 and the latch members 23, 24 are formed as suitable inertia means in such a manner that the rotary member 20 performs, by the inertia thereof, a delayed rotation with respect to the take-up shaft when the webbing is extracted with a predetermined acceleration corresponding to a predetermined acceleration or deceleration of the vehicle.

Also an emergency locking mechanism of the so-called vehicle acceleration sensing type if a ratchet gear is formed on the rotary member 20 and a latch member actuated by means for sensing a predetermined acceleration or deceleration of the vehicle is provided to engage with said ratchet gear to cause a relative rotation of the rotary member 20 with respect to the take-up shaft 9.

In this manner the retractor of the present invention can be arbitrarily constructed as a webbing acceleration sensing type, a vehicle acceleration sensing type or a dual type provided with both of the above-mentioned two functions.

In the present embodiment, in the lower portion of the side plate 2 there is provided a support plate 35 under which is suspended swingably a pendulum member 36 for sensing a predetermined acceleration or deceleration of the vehicle. Also on the support plate 35 there is movably articulated a latch member 38 provided thereunder with a downward projection 38a placed on a bowl-shaped enlarged portion formed on the upper end of the pendulum member 36. Upon inclination of the pendulum member 36a by a predetermined amount corresponding to a predetermined deceleration or acceleration of the vehicle, the latch member 38 is rotated counter clockwise by the bowl-shaped enlarged portion 36a (cf. FIG. 1) to come into engagement with the ratchet gear of the rotary member 20 thereby locking the rotation thereof in the webbing extracting direction. Thus the latch members 23, 24 are rotated clockwise by the support member 13 as explained in the foregoing to engage with the inwardly toothed ratchet gear of the locking means thereby locking the rotation of the take-up shaft in the webbing extracting direction. Although a pendulum inertia member is shown in the present embodiment, it is to be understood that the other inertia members, such as known ball-type inertia member or another inertia member adapted to tumble upon receipt of a determined acceleration, are also usable for the same purpose.

In the following there will be given an explanation on a second embodiment of the present invention, while making reference to FIGS. 7 to 10.

Figure 7:
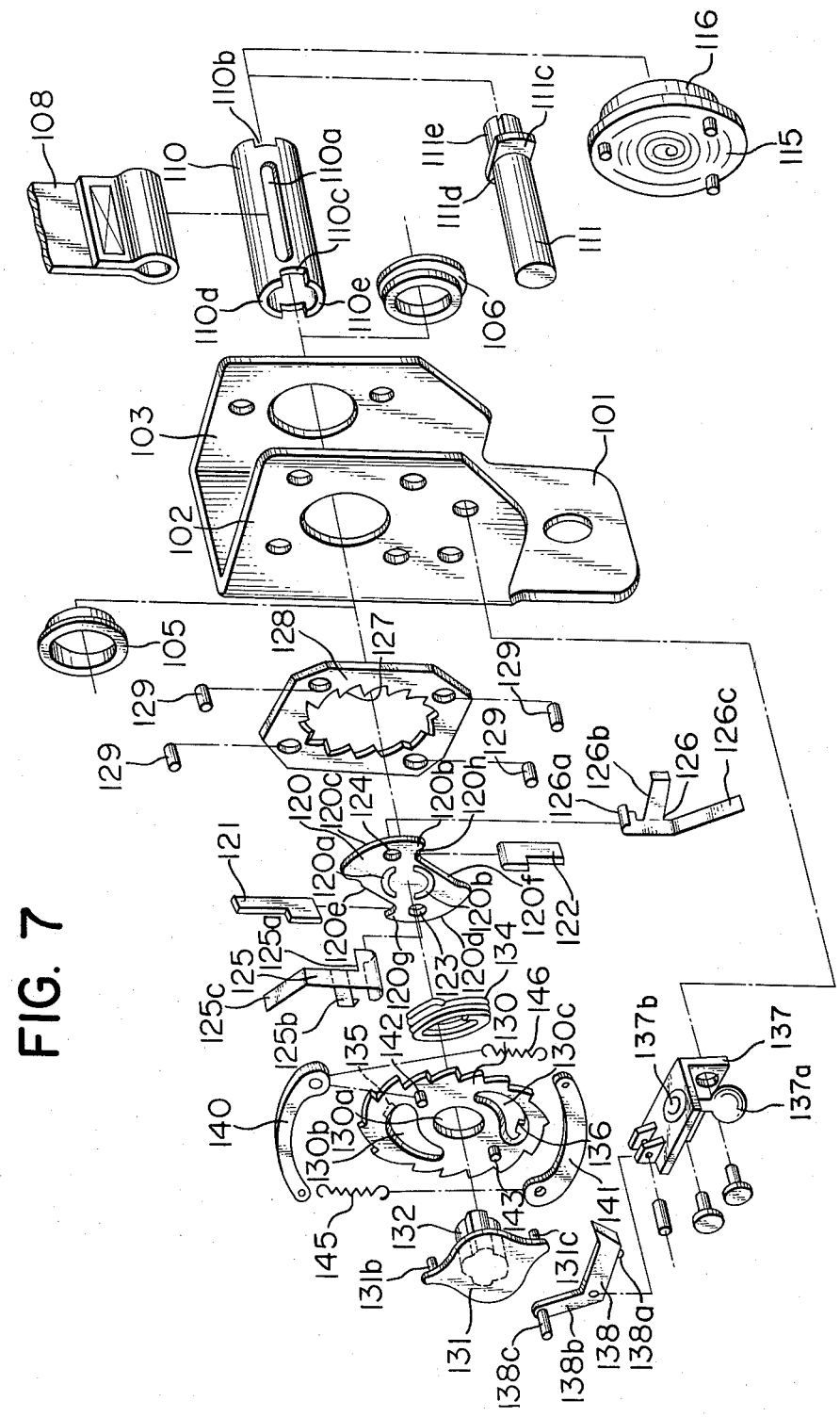
FIG. 7 is a schematic exploded perspective view of a second embodiment of the present invention.
Figure 8:
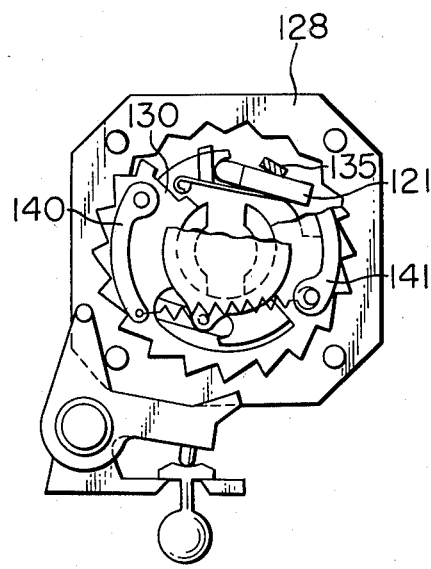
FIG. 8 is a partially cut-off partial lateral view of said second embodiment showing a normal extracting or retracting state.
Figure 9:
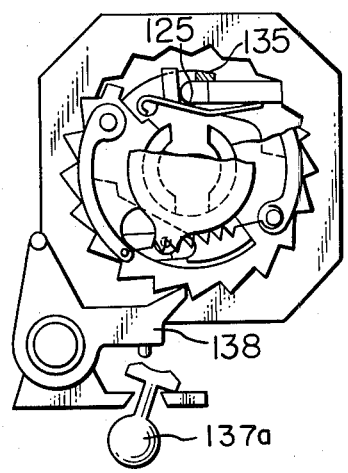
FIG. 9 is a view similar to FIG. 8 showing a state wherein the extraction is locked upon sensing a predetermined acceleration by a pendulum.
Figure 10:
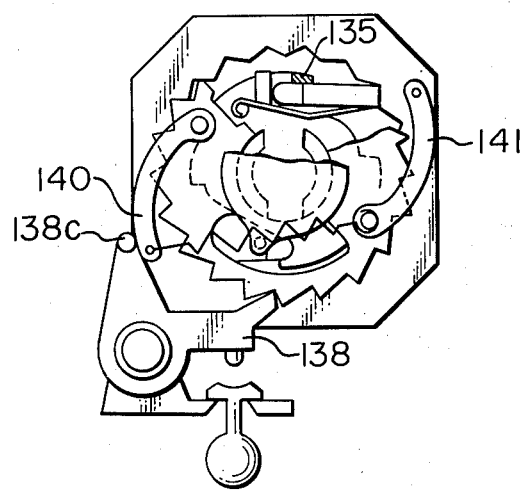
FIG. 10 is a similar view showing a state wherein the extraction is locked upon sensing the rotating speed of the retracting means by the centrifugal force.

Referring to FIG. 7, in a main body or base 101 of the safety belt retractor there are integrally provided mutually parallel lateral plates 102 and 103 which rotatably supports, in the openings provided in the approximate center thereof and through bushings 105 and 106, take-up means for a webbing 108. The take-up means may be of any conventional structure but is principally composed, in the present embodiment, of a cylindrical member 110 formed as a preferably metallic reinforcing member and shaft member 111 of a plastic material. The cylindrical member 110 is provided axially with a slot 110a for inserting the webbing and further provided at the right-hand end thereof with opposed notches 110b (only one is shown in FIG. 7) and at the left-hand end thereof with mutually facing two larger notches 110c which thereby define a pair of axial projections 110d and 110e. The shaft member 111 is a rod-shaped portion extending through the interior of the cylindrical member, the rod-shaped portion being provided in the vicinity of the right-hand end thereof with two projections 111c, 111d respectively engaging with the notches 110b provided in the cylindrical member 110. The shaft member 111 is formed as a free end at the left-hand end thereof. The internal end of the webbing 108 is foldedly woven and inserted into the cylindrical member 110 through the axial slot 110d thereof, whereby the shaft member 111 passes through the folded loop end to secure the webbing 108 to the take-up means. In this manner the take-up means can be easily manufactured and still can have a satisfactory strength due to the presence of the cylindrical member 110.

The extended portion 111e at the right-hand end of the shaft member 111 engages the internal end of a take-up spring 115 the external end of which is mounted on a spring cover 116 affixed on the lateral wall 103, whereby the take-up means being biased in a direction to retract the webbing.

Now in the following there will be given an explanation on the emergency locking mechanism constituting the principal part of the present invention.

The cylindrical member 110 of the take-up means extends at the left-hand end thereof beyond the lateral plate 102, where a support member 120 is affixed. In the present embodiment the support member 120 is provided with curved slots 120a, 120b into which the axial projections 110d, 110e of the cylindrical member 110 are respectively fitted to fix the support member 120 to the cylindrical member 110. The support member 120 is further provided with peripheral portions 120c, 120d located on the same circle and at diametrically opposed positions, and with a pair of notched portions 120e, 120f located between said peripheral portions. The connecting portions between the notched portions 120e, 120f and the peripheral portions 120c, 120d are formed as recesses 120g, 120h in which latch members 121, 122 are rotatably supported. The support member 120 is provided with two holes 123, 124 into which are inserted the end portions 125a, 126a of the plate springs 125, 126 of which branched portions 125b, 126b engage with the peripheral portions 120c, 120d to mount the plate springs 125, 126 on the support member 120. Naturally the mounting of the plate springs 125, 126 on the support member 120 can be achieved in other methods. The spring portions 125c, 126c respectively are maintained in contact with the latch members 121, 122 on the inner side thereof to outwardly bias the latch members.

Around the support member 120 and the latch member 121, 122, locking means 128 provided with an internally-toothed ratchet gear 127 is mounted on the lateral plate 102 by means of pins 129. The pitch diameter of the ratchet gear 127 is larger than the diameter of the support member 120, and the latch members 121, 122 do not engage with said ratchet gear when they are located in an inward unlocking position to be explained later against the biasing force of the plate springs 125, 126 while the latch members 121, 122, in an outward locking position thereof under the biasing force of the plate springs 125, 126, come into engagement with the ratchet gear 127 of locking means 128 to lock the rotation of the retracting means in the webbing extracting direction.

Axially at the left to the support member 120 there is provided a ratchet plate 130 which is rotatably supported by a center hole 130a thereof about a shaft 132 of a stopper member 131. The shaft 132 is fitted into the notches 110c at the left-hand end of the cylindrical member 110 to maintain the stopper member affixed to the cylindrical member 110, whereby the stopper member 131 being rotated with the cylindrical member 110. The ratchet plate 130 is provided with two slots 130b, 130c in the circular direction, in which engaged are pins 131b, 131c mounted on the stopper member 131, thereby transmitting the rotation of the take-up means to the ratchet plate 130. On a face of the ratchet plate 130 facing the support member 120 there are provided two projections 135, 136 in diametrically opposed positions, said projections being adapted to engage with the latch members 121, 122 from the radially external side thereof in the normal webbing extracting state to maintain the latch members 121, 122 in the aforementioned unlocking position against the biasing force of the plate springs 125, 126. Between the ratchet plate 130 and take-up means, namely between the ratchet plate 130 and the support member 120 or the cylindrical member 110 there is provided a coil spring 134 to bias the ratchet plate 130 in the clockwise direction in FIG. 7, whereby the ratchet plate 130 assumes a first position in which the projections 135, 136 thereof engage with the latch members 121, 122 to maintain the same in the aforementioned unlocking position. Also in this state the latch members 121, 122 prevent a further rotation of the ratchet plate 130 by the engagement with the projections 135, 136. Upon rotation of the take-up means in the webbing retracting direction, the engagement between the pins 131b, 131c of the stopper member 131 and the slots 130b, 130c of the ratchet plate 130 causes the plate 130 to rotate in the same direction, while the projections 135, 136 maintaining the latch members 121, 122 in the aforementioned unlocking position by the biasing force of the coil spring 134. Consequently in the normal state the webbing can be extracted or retracted while the latch members 121, 122 are maintained in the unlocking position by the projections 135, 136. However, when the ratchet plate 130 alone is stopped while the take-up means is rotated together with the ratchet plate 130 in the webbing extracting direction, the take-up means including the support member 120 continues to rotate to develop a relative delay in the rotation of the ratchet plate 130, whereby the latch members 121, 122 are released from the projections 135, 136, and spread outwardly to the aforementioned locking position by the biasing force of the plate springs 125, 126 and engage with the ratchet gear 127 of the locking means to lock the take-up means.

The stopping of the ratchet plate 130 can be achieved either by sensing a determined acceleration of the vehicle, or by sensing the extracting speed or extracting angular velocity of the webbing, or preferably by both types of sensing.

In the present embodiment, in the lower portion of the lateral plate 102 there is mounted a support plate 137 from which swingably suspended is a pendulum member 137a for sensing a determined acceleration of the vehicle. Also on said support plate 137 there is pivotably provided a latch member 138 having, on the lower side of an end thereof, a downward projection 138a which is placed on a bowl-shaped enlarged portion formed at the upper end of the pendulum member 137a. Upon inclination of the pendulum member 137a by a determined amount in response to a determined acceleration or deceleration of the vehicle, the latch member 138 is pivoted counter-clockwise (FIG. 7) by the enlarged portion 137b to engage with the ratchet gear of the ratchet plate 130 thereby arresting the rotation thereof in the webbing extracting direction. Thus the latch members 121, 122 engage with the ratchet gear of the locking means to lock the rotation of the take-up shaft in the webbing extracting direction. Although in the present embodiment there is shown a pendulum inertia member for sensing the acceleration of the vehicle, it is also naturally possible to employ a ball-type inertia member or another inertia member adapted to tumble in response to a determined acceleration.

Also in the present embodiment the ratchet plate 130 is provided with centrifugal force sensing levers 140, 141 which are positioned symmetric to the shaft and pivotably mounted by the pins 142, 143 at the ends thereof. These two levers are of a same shape and have tension springs 145, 146 respectively provided between the other ends of levers 140, 141 and the pivoting pins 142, 143 of the other levers. Upon rotation of the retracting means in the webbing extracting direction, the centrifugal force sensing levers 140, 141 pivot about the pins 142, 143 by the centrifugal force applied thereto.

The aforementioned pivotable latch member 138 is provided with an integral rear extension 138b having an end pin 138c, which protrudes in the rotating trajectory of the sensing levers 140, 141 when they are centrifugally pivoted by a determined amount, whereby the levers 140, 141 rotate the latch member 138 counter-clockwise upon contact therewith thereby arresting the rotation of the ratchet plate 130 in a similar manner as explained in the foregoing in connection with the pendulum member.

Figure 11:
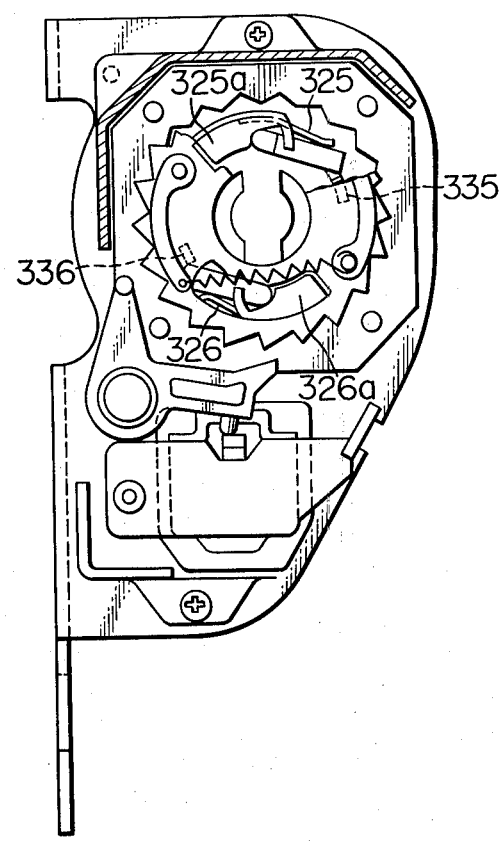
FIG. 11 is a lateral view of a third embodiment from which a cover is removed.
Figure 12:
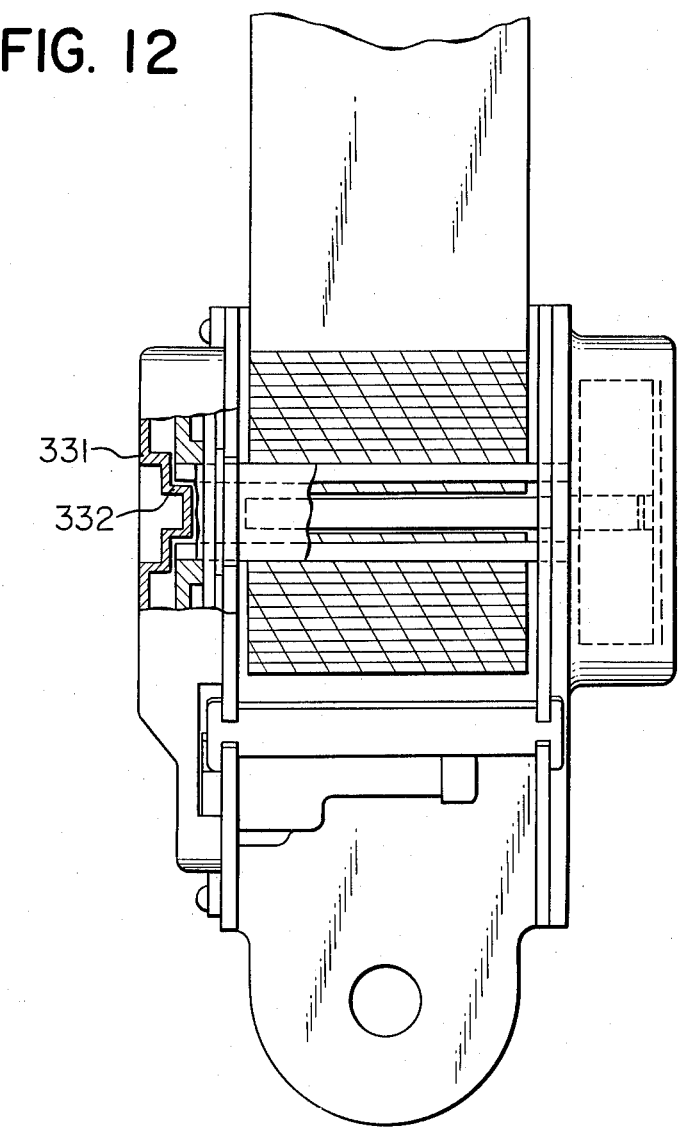
FIG. 12 is an axially partially cut-off front view of said third embodiment.
Figure 13:
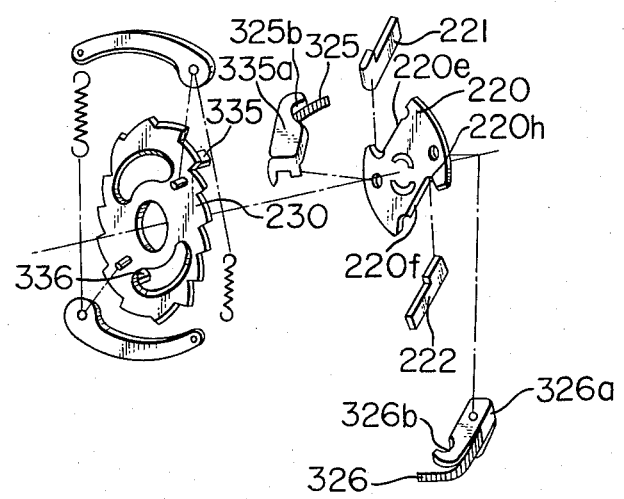
FIG. 13 is an exploded perspective view of the principal portion of said third embodiment.

In the following there will be given an explanation on a third embodiment of the present invention, while making reference to FIGS. 11 to 13. The explanation of the third embodiment will be principally limited to the difference from the foregoing second embodiment.

In the third embodiment a support member 220 mounted on a cylindrical member of the take-up means is provided with support pieces 325a, 326a on which are mounted, for example by caulking, plate springs 325, 326 for biasing the locking latch members 221, 222. The support pieces 325a, 326a are provided with recesses 325b, 326b overlapping with recesses 220g, 220h constituting a part of notches 220e, 220f of the support member 220, and in the recesses 220g, 325b, 220h and 326b there is pivotably provided latch members 221, 222. The plate springs 325, 326 in the third embodiment come into contact with the latch members 221, 222, different from the foregoing second embodiment, from the outside thereof to bias the latch members 221, 222 inwardly to the unlocking position.

Further in the third embodiment the projections 335, 336 of the ratchet plate 230 engage with the latch members 221, 222 from the internal sides thereof, and are usually urged to the edge portions of the support member 220 by the plate springs 325, 326 whereby the ratchet plate 230 is maintained integral with the support member 220. A stopper member 331 is formed as a cover affixed to the lateral plate and is provided with an inward axial projection 332 to rotatably support the ratchet plate 230. In the third embodiment of the abovementioned structure, the normal or reverse rotation of the retracting means causes a corresponding rotation of the ratchet plate 230 due to the engagement between the support member 220, latch members 221, 222 and projections 335, 336 of the ratchet plate 230. However when the rotation of the ratchet plate 230 is arrested by the pivotable latch member 238, the projections 335, 336 cause the spreading of the latch members 221, 222 to the locking position against the biasing force of the plate springs 325, 326.

Although the acceleration sensing means employed in the third embodiment is different from the pendulum type member shown in the foregoing embodiments, detailed explanation is omitted here as this difference is irrelevant to the function of the retractor.

As detailedly explained in the foregoing, the retractor of the present invention can be utilized either as an emergency locking mechanism functionable upon sensing the webbing extracting acceleration in response to a determined acceleration of the vehicle caused for example at a collision thereof, or as an emergency locking mechanism functionable upon directly sensing a determined acceleration of the vehicle, or as a mechanism provided with both of the above-mentioned functions.

What I claim is:

1. An emergency locking mechanism for the webbing take-up shaft of a safety belt retractor for a motor vehicle comprising:

an inertia sensitive ratchet gear supported coaxially on the take-up shaft for rotation therewith in a normal state, but rotating relative to the take-up shaft due to its inertia when the webbing pay-out exceeds a predetermined rate;

a latch member pivotally supported on the ratchet gear and adapted to pivot outwardly from the center of rotation of the ratchet gear;

vehicle acceleration sensing means for sensing a predetermined speed change of the vehicle and having means for engaging the ratchet gear to arrest its rotation upon sensing said predetermined speed change to cause relative rotation between the ratchet gear and the take-up shaft when the take-up shaft rotates in response to webbing pay-out;

a fixed member attached to the retractor and adapted to be engaged by the latch member when the latch member pivots outwardly; and an engaging member attached to the take-up shaft, the engaging member causing the latch member to pivot outwardly and engage the fixed member when the ratchet gear rotates relative to the take-up shaft, engagement between the latch member and the engaging member arresting the rotation of the take-up shaft when the latch member engages the fixed member.

2. A safety belt retractor having a take-up shaft biased in a webbing retracting direction for use in a motor vehicle and provided with an emergency locking mechanism comprising:

an inertia sensitive ratchet gear member supported coaxially and rotatably on the take-up shaft, the ratchet gear member being able to sense a predetermined acceleration of webbing pay-out by its own inertia and formed with two arcuate slots symmetrical with respect to its center of rotation;

a pair of first latch members each pivotally supported on said ratchet gear member by first pins positioned symmetrically with respect to the center of rotation, each latch member having a second pin passing through the arcuate slot of the ratchet gear member;

a support member fixed to said take-up shaft and having two surfaces for engaging the respective latch members;

biasing means between the first pin of one latch member and the second pin of the other latch member for biasing the latch members toward the engaging surfaces so that rotation of the take-up shaft is transmitted to the ratchet gear member to rotate it in unison with the take-up shaft;

the ratchet gear member moving relative to the take-up shaft due to the inertia of the ratchet gear member when it senses said predetermined acceleration of the webbing pay-out, the first latch members being displaced in a direction away from the center of rotation when said ratchet gear member and the take-up shaft move relative to each other;

vehicle acceleration sensing means for directly sensing a predetermined speed change of the vehicle;

a second latch member for engaging a ratchet gear portion of the ratchet gear member to stop rotation thereof when the vehicle acceleration sensing means senses the predetermined speed change of the vehicle; and an inwardly toothed member fixed on a base member of the safety belt retractor, the inwardly toothed member being adapted to engage said first latch members to arrest the rotation of the take-up shaft when said first latch members are displaced in a direction away from the center of rotation.

3. A safety belt retractor having a take-up shaft for webbing and provided with an emergency locking mechanism having means for sensing a predetermined acceleration of the vehicle and adapted to lock a webbing retracting means upon such sensing comprising:

a rotary member supported coaxially on the take-up shaft and adapted to rotate integrally with the take-up shaft in a normal state;

arresting means for arresting the rotation of said rotary member in response to the sensing means sensing the predetermined acceleration of the vehicle;

a support member integrally provided with the take-up means axially parallel to said rotary member;

latch means comprising at least a first latch member pivotally supported on said support member and capable of assuming a locking position and a normal unlocking position, and a biasing member for biasing said latch member toward said locking position;

an engaging member provided on said rotary member, said engaging member normally engaging said latch member to maintain said latch member in the unlocking position but releasing said latch member to allow the displacement of said latch member to the locking position when said rotary member is arrested and moves relative to the take-up shaft; and locking means adapted to engage said first latch member in the locking position to arrest the rotation of the webbing retracting means.

4. A safety belt retractor according to claim 3, wherein said locking means comprises an inwardly toothed ratchet gear engageable with said first latch member.

5. A safety belt retractor according to claim 4 wherein said ratchet gear is mounted on a base member of the safety belt retractor.

6. A safety belt retractor according to claim 3, wherein said rotary member is provided with an externally toothed ratchet gear portion, and said arresting means comprises a second latch member capable of assuming a normal first position and a second position to engage with said ratchet gear in cooperation with said sensing means to arrest the rotation of said rotary member in response to the predetermined acceleration of the vehicle.

7. A safety belt retractor according to claim 6, wherein said sensing means comprises an inertial displacement means capable of assuming a normal first displacement position and a second displacement position corresponding to the predetermined acceleration of the vehicle, said second latch member being adapted to move from said unlocking position to said locking position in response to said inertial displacement means.

8. A safety belt retractor according to claim 3 comprising a centrifugal force sensing member pivotably supported by said rotary member and capable of displacement from a normal first position to a second position by a centrifugal force in response to the rotation of the retracting means resulting from extraction of the webbing, and said first latch member is adapted to displace to said locking position in cooperation with said centrifugal force sensing member.

* * * * *